United States Patent [19]

Buck et al.

[11] Patent Number: 4,935,141
[45] Date of Patent: Jun. 19, 1990

[54] SELECTIVELY PERMEABLE ASYMMETRIC MEMBRANES SUITABLE FOR USE IN HEMODIALYSIS AND PROCESSES FOR MANUFACTURING SUCH MEMBRANES

[75] Inventors: Reinhold J. Buck, Alleshausen; Hermann J. Goehl, Bisingen-Zimmern, both of Fed. Rep. of Germany

[73] Assignee: Gambro, Dialysatoren KG, Fed. Rep. of Germany

[21] Appl. No.: 235,373

[22] Filed: Aug. 23, 1988

[30] Foreign Application Priority Data

Aug. 31, 1987 [SE] Sweden ................................ 8703367

[51] Int. Cl.$^5$ .............................................. B01D 13/00
[52] U.S. Cl. ........................... 210/500.38; 210/500.41; 210/500.43; 264/41
[58] Field of Search ...................... 210/500.41, 500.36, 210/500.38, 500.4, 500.43; 264/41, 49, 177.14

[56] References Cited

U.S. PATENT DOCUMENTS

| 4,051,300 | 9/1977 | Klein ..................................... 264/184 |
| 4,286,015 | 8/1981 | Yoshida et al. ............ 264/177.14 X |
| 4,664,669 | 5/1987 | Ohyabu et al. ...................... 427/245 |
| 4,720,343 | 1/1988 | Walch et al. ................... 210/500.28 |

FOREIGN PATENT DOCUMENTS

| EP0168783 | 7/1985 | European Pat. Off. . |
| 60-246812 | 12/1985 | Japan . |
| 61-257203 | 11/1986 | Japan . |
| WO8600028 | 1/1986 | World Int. Prop. O. . |

Primary Examiner—Frank Spear
Attorney, Agent, or Firm—Lerner, David, Littenberg, Krumholz & Mentlik

[57] ABSTRACT

Selectively permeable asymmetric membranes are disclosed which are suitable for use in hemodialysis processes and the like. The membranes are produced from hydrophobic and hydrophilic polymers, and include a three-layered structure including a first dense thin skin layer which includes uniform pores of a size whereby proteins having a molecular weight of at least that of albumin are substantially rejected therefrom, an intermediate second layer in the form of a sponge and having a higher diffusive permeability than the first layer, and a third layer with a finger-like structure which provides mechanical stability. These membranes are preferably formed in the shape of hollow fibers, with the first layer as the inner layer thereof. Processes for manufacturing these membranes are also disclosed, and include separately mixing both the hydrophobic and hydrophilic polymers in solvents therefor, and then mixing these two solutions before extruding the mixture into a precipitating liquid to form the precipitated membrane by a wet-phase inversion technique.

42 Claims, 4 Drawing Sheets

Fig. 8

SELECTIVELY PERMEABLE ASYMMETRIC MEMBRANES SUITABLE FOR USE IN HEMODIALYSIS AND PROCESSES FOR MANUFACTURING SUCH MEMBRANES

FIELD OF THE INVENTION

The present invention relates to selectively permeable asymmetric membranes. More particularly, the present invention relates to such membranes suitable for use in processes such as hemodialysis. Still more particularly, the present invention relates to such asymmetric membranes which include a hydrophobic first polymer, a hydrophilic second polymer, and suitable additives. Still more particularly, the present invention relates to processes for manufacturing such selectively permeable asymmetric membranes.

BACKGROUND OF THE INVENTION

Selectively permeable (also referred to as permselective) asymmetric membranes are particularly advantageous when used in connection with various types of medical treatments, such as hemodialysis, hemofiltration, plasmapheresis, and immunotherapy. Such membranes may also be used in connection with dialysis and filtration in general, such as in connection with cleaning or depyrogenization of water.

These types of membranes are described in detail, for example, in EP-A-O168 783, EP-B-O082 433, and WO 86/00028. The contents of these publications are therefore included in the present application by reference thereto. Referring specifically to the latter publication (WO 86/00028), there is disclosed therein asymmetrical hollow fiber membranes which include a relatively dense skin layer of less than about 1 micron on their outer periphery, bounded by an open structure of increasing porosity towards the inner surface of the hollow fibers, which porous structure comprises microvoids having the shape of elongated fingers open to the inner surface of the membranes. This publication also discloses the methods of obtaining these asymmetric hollow fibers via known spinning techniques by a dry-wet process which includes adding to the spinning solution of the polymer in the solvent at least one specified additive and adding a particular fluid through the center. FIG. 7 in this publication shows this particular structure.

The other two cited publications also disclose asymmetric membranes of this type comprised of mixtures of hydrophobic and hydrophilic polymers.

SUMMARY OF THE INVENTION

In accordance with the present invention, membranes of the above-described type, namely selectively permeable asymmetric membranes which are suitable for use in hemodialysis, have been produced by providing a novel integral three-layered structure which includes a first layer in the form of a dense, rather thin skin, which is responsible for the sieving properties of the membrane, a second layer in the form of a sponge structure, having high diffusive permeability and which serves as a support for the first layer, and a third layer in the form of an open finger-like structure which provides the membrane with structural stability. The advantages obtained by using such a structure are explained in more detail herein.

Most particularly, in accordance with the present invention, the applicants have provided a selectively permeable asymmetric membrane comprising a hydrophobic polymer and a hydrophilic polymer in which the membrane includes a first layer comprising a dense, thin skin layer including substantially uniform pore openings defining the selective permeability of the membrane, an intermediate second layer in contact with the first layer in the form of a sponge having a diffusive permeability which is higher than that of the first layer, the intermediate second layer supporting the first layer, and a third layer in contact with the intermediate second layer and including a finger-like structure providing mechanical stability for the membrane, the substantially uniform pore openings in the first layer having a size whereby proteins which have a molecular weight of at least that of albumin are substantially completely rejected from the membrane. In a preferred embodiment, the pore openings have a pore size not greater than about 80 Angstroms.

In accordance with another embodiment of the membranes of the present invention, they may be in the form of a substantially flat sheet or in the form of hollow fibers, in which case the first layer preferably comprises the inner layer of the hollow fiber, and the third layer preferably comprises the outer layer of the hollow fiber.

In accordance with another embodiment of the membranes of the present invention, they are prepared from a polymer mixture including the hydrophobic and hydrophilic polymers in amounts such that the fraction of hydrophobic polymer is between about 85 and 95% thereof and the fraction of hydrophilic polymer is between about 5 and 15% thereof.

In accordance with a preferred embodiment of the membranes of the present invention the hydrophobic polymer can be a polyarylsulfone, polycarbonate, polyamide, polyvinylchloride, modified acrylic acid, polyether, polyurethane, polyetherketone, polyacrylonitrile, polypropylene, polyetherimide and copolymers thereof, and most preferably a polyamide. In addition, the hydrophilic polymers preferably are polyvinylpyrrolidone, polyethyleneglycol, polyglycolmonoester, copolymers of polyethyleneglycol with polypropyleneglycol, water soluble cellulosic derivatives, polysorbate, and polyethylene-polypropylene oxide copolymers, and most preferably polyvinylpyrrolidone.

In accordance with another embodiment of the present invention, processes for manufacturing selectively permeable asymmetric membranes suitable for use in hemodialysis have now been discovered, and include dissolving a hydrophobic polymer in a first solvent so as to prepare a first solution, dissolving a hydrophilic polymer in a second solvent so as to prepare a second solution, mixing the first and second solutions, and introducing that mixture into a precipitating liquid to form a coagulated membrane therefrom. In a preferred embodiment, mixing of the first and second solutions is conducted at a first temperature, preferably about 60° C., and introduction of the mixture into the precipitating liquid is conducted at a second temperature, which is preferably lower than the first temperature, and is preferably below about 30° C.

In accordance with a preferred embodiment of the process of the present invention, the first and second solvents can be dimethylacetamide, dimethylformamide, dimethylsulfoxide, n-methylpyrrolidone, and preferably dimethylsulfoxide. Preferably, the precipitating liquid also includes a solvent for the hydrophilic polymer, such as water, as well as a solvent for the hydrophobic polymer, such as dimethylsulfoxide. Most preferably, the precipitating liquid also includes a hydrophilic polymer, such as the polyvinylpyrrolidone.

In accordance with a preferred embodiment of the process of the present invention, introduction of the mixture into the precipitating liquid comprises extrusion of the hollow fiber, in which the precipitating liquid is simultaneously extruded through the center of the hollow fiber within the mixture of first and second solutions.

BRIEF DESCRIPTION OF THE DRAWINGS

The followed detailed description may be more fully understood with reference to the drawings herein in which:

FIG. 3 is a graph of the sieving coefficients of membranes which include membranes in accordance with the present invention.

FIG. 4 is a compilation of the results of protein absorption measurements on the membranes shown in FIG. 3;

DETAILED DESCRIPTION

The selectively permeable asymmetric membranes in accordance with the present invention have an asymmetric structure which is characterized by three integral layers, each of which has a different structure and function. These three integral layers thus include:

(a) a smooth and dense homogeneous thin (preferably $<1\mu$) layer, which determines the sieving properties of the membrane;

(b) a porous (sponge-like) layer (preferably having a thickness of about $1-20\mu$, and most preferably of about $3-5\mu$) which determines the mechanical stability of the inner layer (layer (a)), and which acts as a safety barrier should inner layer (a) have a defect; and (c) an open finger-like supporting layer, which provides the membrane with its mechanical stability for trans-membrane pressures and stresses which arise during manufacturing and/or handling thereof.

This membrane structure demonstrates outstanding properties for the various blood purification techniques, such as hemodialysis, hemodiafiltration and hemofiltration, particularly because it has a high diffusive permeability for low molecular weight substances, a high permeability for middle molecular weight substances (i.e., with molecular weights between about 1,000 and 15,000), such as $\beta_2$-microglobulin ($\overline{M}_w$ 11,500), and it has an ultrafiltration rate which is readily adaptable to hemodialysis, hemodiafiltration and hemofiltration, as well as outstanding biocompatibility.

When the membrane of this invention is manufactured in the form of a hollow fiber, the inner layer or blood side includes the skin layer, with a thickness of preferably less than about $1\mu$. The substantially uniform pores in this skin layer are typically in the range of between about 20 and 200 Angstroms, preferably between about 20 and 80 Angstroms, i.e., most preferably of about 80 Angstroms, and this layer determines the sieving and permeability properties of the membrane. The second intermediate layer is then the sponge-like structure, preferably with a thickness of about $5\mu$. This layer mechanically supports the primary skin layer, and provides the skin with continuous reinforcement as well as an improved resistance to burst and leakages (pin holes). The third layer has an open finger-like structure, with a thickness of about 20 to $60\mu$, and preferably about $40\mu$. The void volume in this layer is high, and provides low resistance for convective (filtration) and diffusive transport.

Figure 1A:
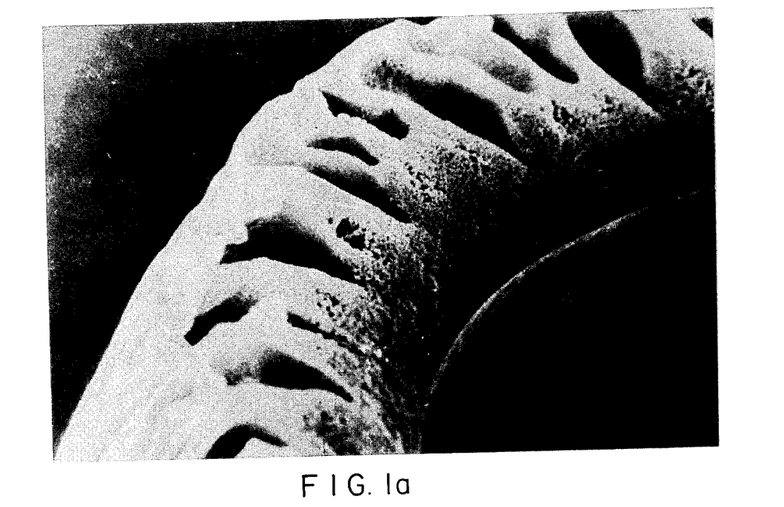
FIG. 1a is a scanning electromicroscopic photograph of the membrane structure in accordance with the present invention.
Figure 1B:
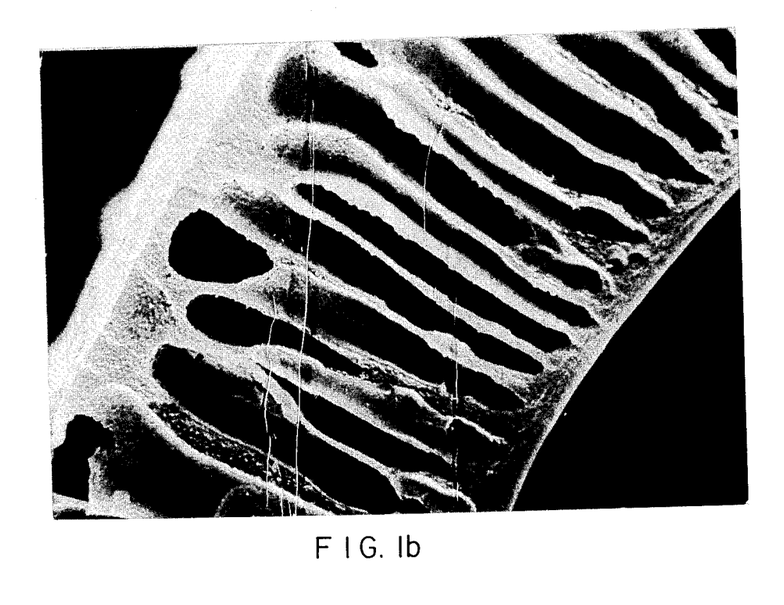
FIG. 1b is another scanning electromicroscopic photograph of the membrane structure in accordance with the present invention.
Figure 2A:
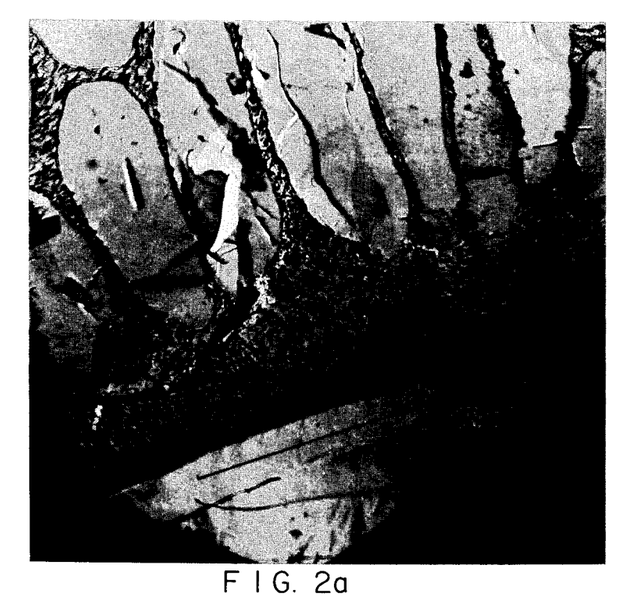
FIG. 2a is a more detailed transmission electromicroscopic photograph of the skin and porous layer structure of the membrane of the present invention.
Figure 2B:
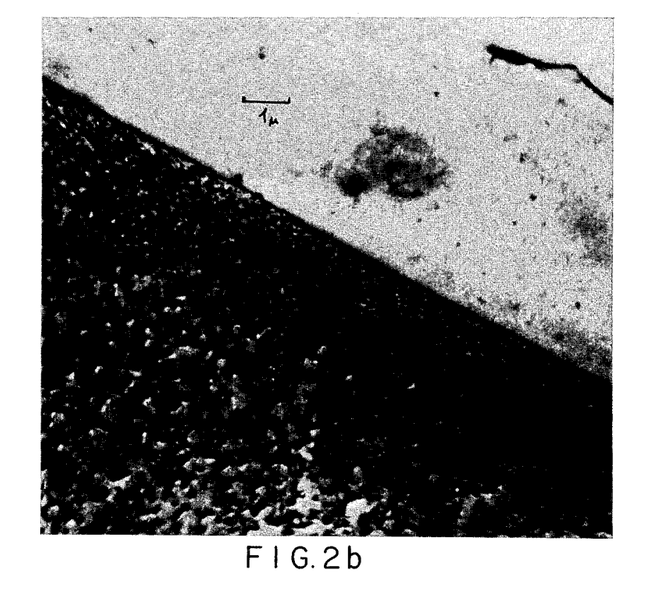
FIG. 2b is another more detailed transmission electromicroscopic photograph of the skin and porous layer structure of the membrane of the present invention.

The scanning electromicroscopic (SEM) pictures set forth in FIGS. 1a and 1b show the entire three-layered membrane structure. Those in FIGS. 2a and 2b shown in more detail the inner skin and porous intermediate layers. In order to obtain these pictures the membranes had to be prepared in the following manner: the frozen membrane was first cut into microtom slides; the membrane slides were then etched and coated with carbon or platinum; and the replica was then magnified with TEM.

In the above-mentioned publication EP-A-O 168 783, a membrane is described for use in similar applications as is the case with the membrane according to the present invention, but in that case it includes the sponge-like structure throughout its entire thickness. The inner side of the membrane according to that publication demonstrates a pore size of about 150 Angstrom under the microscope. The pores thereof then increase from the inner to the outer side. The disadvantage of such a membrane is that proteins can penetrate into the structure of the membrane, and thus alter the membrane's permeability.

The membranes of the present invention have a high diffusive permeability for substances which are to be removed in hemodialysis. Urea is one of these substances which is generally used as a characterizing test substance therefor. The diffusive permeability (Pm) measured (according to the method described in NIH Report 77-1294 entitled "Evaluation of Hemodialyzers and Dialysis Membranes") in a test cell is much higher than corresponding values measured for a membrane in accordance with the above-mentioned publication EP-B-O 082 433. (The membrane of this publication is used for comparative purposes herein particularly since the membranes of the present invention were primarily intended to be an improvement over membranes such as those of EP-B-O 082 433). The Pm values of membranes according to the present invention are between about 110 and $150 \times 10^{-5}$ cm/sec, whereas this publication reports Pm values of about $75 \times 10^{-5}$ cm/sec ($45 \times 10^{-3}$ cm/min).

The diffusive permeability of a membrane determines the clearance of a hemodialyzer. The mathematical description of this relationship is:

$$\text{Clearance} = Q_B \cdot \left[ \frac{P_m \cdot A/Q_B}{1-e} \right]$$

The high Pm values of the membranes according to the present invention thus correspond to clearance values for a 1 m²-dialyzer of between about 175 and 185 ml/min at the standard conditions of 200 ml/min. blood flow and 500 ml/min dialysate flow and TMP (transmembrane pressures) of 0 mmHg measured with whole blood. The high diffusive permeability of these membranes is a result of the low diffusive resistance of the membrane, which is caused by the high degree of hydrophilicity of the membrane and the above-described open structure thereof.

Hemodialysis, hemodiafiltration and hemofiltration membranes are also characterized by their ultrafiltration permeability (other expressions are hydraulic or mechanical permeability, or convective permeability). High ultrafiltration rates are desired for hemofiltration and hemodiafiltration processes. The membranes according to the present invention demonstrate much higher ultrafiltration rates for water (about 400 ml/h mmHg.m², measured at 37° C.) than most other membranes. The membrane according to EP-A-O 082 433, for example, is reported to show a significantly lower ultrafiltration rate ($200 \times 10^{-3}$ 1/m².d.bar, corresponding to 110 ml/h.mmHg.m²).

Membranes which are intended for use in hemodialysis and hemofiltration on one hand required the above-described high permeability, while on the other hand they must also reject proteins with high molecular weight. For albumin ($\overline{M}_w$ 68,000) the rejection should be infinite or close to infinite. Otherwise, the patient will lose essential proteins.

Recent clinical investigations, however, provide an indication that a protein with a considerably low molecular weight ($\beta_2$-microglobulin, with a molecular weight of 11,500) should be removed during dialysis treatments because it causes amyloidosis.

With the membranes of the present invention, the combination of these two requirements can now be fulfilled, i.e., it is now possible to not only provide a high sieving coefficient (S) of at least about 0.6, e.g., between about 0.6 and 0.8, for $\beta_2$-microglobulin, but at the same time provide a low sieving coefficient for albumin, of about 0.001. These sieving properties have been measured in clinical treatment on human blood. In this regard, S can be defined as follows:

$$S = \frac{\text{concentration in filtrate of a substance}}{\text{mean value of blood inlet and outlet}} = \frac{C_{UF}}{\frac{C_{in} + C_{out}}{2}}$$

Referring specifically to FIG. 3 hereof, it can be noted that these sieving characteristics are achieved because the membranes according to the present invention have a very narrow pore size distribution in the inner membrane skin. In contrast to the membranes according to EP-A-O 168 783, the inner skin membrane layer according to the present invention (which is responsible for the sieving properties) is very thin. The thinner this thin layer is, the more homogeneous a pore size can be achieved therein.

Another advantage of the membranes according to the present invention is that the difference between the sieving coefficients, measured in water (in vitro) and in plasma or whole blood (in vivo), respectively, is small. Once again referring to FIG. 3, there is also shown therein for comparative purposes the sieving coefficient of a membrane made from the same hydrophobic PA (polyamide) material, but without the addition of the hydrophilic polymer. In that membrane there is shown to be a significantly large difference between "in vitro" and "in vivo" sieving.

The reason for the negligible difference therebetween with the membranes of the present invention is the lower protein adsorption for these membranes. This reduced adsorption of proteins decreases the risk that there will be a change in the membrane pore sizes. This adsorption was investigated by a method which is described in Ritz et al, "Protein Layer Formation on Artificial Membranes," (C Tegernsee-symposium, March 1986), Contribution to Nephrology No. 50, Karger, Basel, which is incorporated herein by reference thereto.

Turning to FIG. 4, this figure presents the results of adsorption measurements on both types of membranes, and clearly shows that much higher amounts of protein can be rinsed back and eluted from the more hydrophobic membranes of the above-mentioned publication.

These results demonstrate that in the membranes of the present invention less proteins are adsorbed on the membrane and in the membrane pores. The effect of this is that only a small or essentially no change of the effective pore size and the sieving properties of these membranes are shown.

Referring again to FIG. 4, it can also be noted that TBS stands for trisbuffered solution, and that part III of this Figures shows the qualitative results of the elution of the membrane with three different elution fluids, namely, SDS/Triton solution (sodium dodecylsulfate), urea solution, and sodium chloride solution. These elution fluids were used subsequent to the rinsing procedures shown in parts I and II, respectively, in order to eluate the residual proteins. The SDS/Triton solution dissolves hydrophobic-hydrophilic binding sites, the urea dissolves the hydrogen binding sites, and the NaCl dissolves the ionic sites. No proteins could be detected in these fluids from the membranes of the present invention (in this case PA/PVP).

In the case where these membranes are to be used in hemodialysis, the membranes should thus also reject bacteriological materials. It has however, been found in some clinical studies that endotoxins, for example, may pass through the cellulosic membranes which are normally used for dialysis, and thus cause fever reactions.

With the membranes of the present invention, however, this risk is reduced by its very high rejection capability of bacteriological material. Endotoxins (from E-coli) are thus rejected by these membranes with a logarithmic reduction of about 3.5 to 4.5. The reason for this excellent rejection for endotoxins and other such bacteriological material is that the pore sizes of the inner skin layer hereof are within a very narrow range, and that the maximum pore size does not exceed about 80 Angstrom ($\cong 0.008\mu$). The logarithmic reduction value (LRV) can be defined as follows:

$$LRV = \log_{10}\left[\frac{\text{number of organisms in challenge suspension}}{\text{number of organisms in filtrate}}\right]$$

where LRV=3 means: 999 out of 1000 endotoxins are eliminated.

The reduction value for bacteria pseudomonas diminuta stam ATCC 19146 was measured with $LRV > 10^7$. these bacteria are larger in size, and are therefore rejected to a higher degree.

Figure 5:
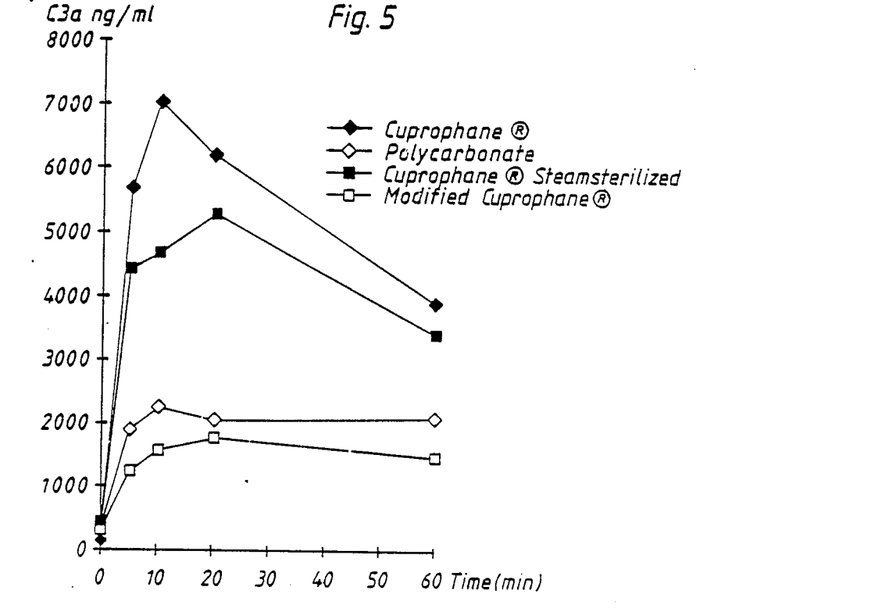
FIG. 5 is a graph of the increase of complement factors $C_{3a}$ during the initial phase of dialysis treatment for various membranes.

It is also reported, for example, that cellulosic membranes like Cuprophan or saponified cellulose might activate the complement system. This activation can be measured by an increase in the complement factors $C_{3a}$, $C_{3d}$, $C_{5a}$, and primarily $C_{3a}$, during the first 15 to 20 minutes of the dialysis treatment. Whereas Cuprophan shows an increase of the $C_{3a}$ factor concentration in the patient's blood from 10 to 7,000 ng/ml (see FIG. 5), there was no such increase measured for the membranes according to the present invention when it was made according to the above examples.

Figure 6:
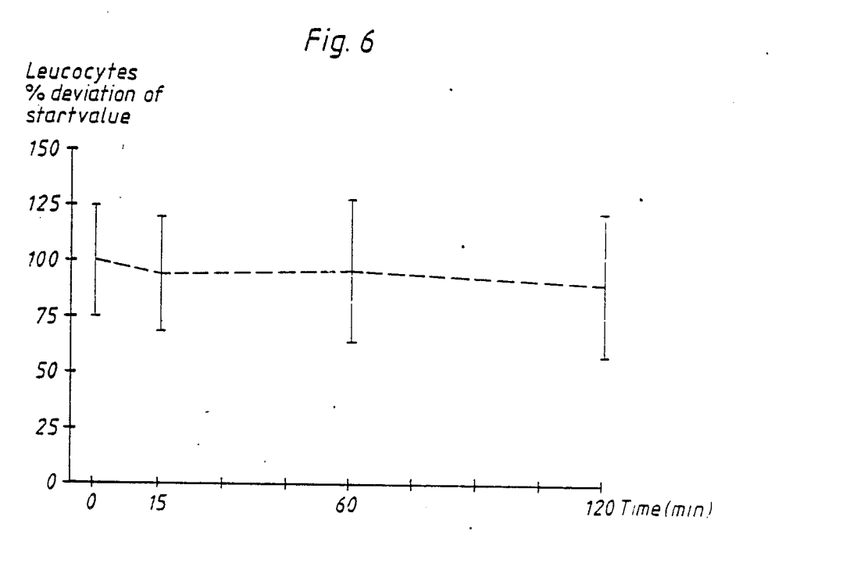
FIG. 6 is a graph of the number of leucocytes in a patient's blood by hemodialysis using a membrane in accordance with the present invention.

Another parameter is the change of leucocyte cells in the blood during the dialysis treatment. Once again, by using Cuprophan membranes, the number of leucocytes in the patient's blood drops within the first 15 to 20 minutes to about 20% of the initial value. Only a small drop to about 90% of the initial value is seen, however, with the membranes made in accordance with the above examples (see FIG. 6).

The $C_{3a}$ factor concentration and the leucocyte changes are presently used as parameters to characterize biocompatibility. Low changes in these two parameters indicate good biocompatibility.

The manufacture of the membranes according to the present invention utilizes a phase inversion process, in which a polymer or a mixture of polymers is dissolved in a solvent. The solution is then extruded through a spinning nozzle (for hollow fibers) or a slit nozzle (for flat films) into a fluid bath containing a non-solvent for the polymer. The non-solvent then replaces the solvent, and the polymer is thus precipitated to an inverted solid phase.

For the membranes of the present invention the hydrophobic polymer, the hydrophilic polymer and an additive are mixed in the following manner: the hydrophobic polymer, preferably polyamide, is first dissolved in a solvent, preferably DMSO (dimethylsulfoxide); and the hydrophilic polymer, preferably PVP (polyvinylpyrrolidone), is then separately premixed in a solvent, preferably DMSO. These two solutions are then mixed together, at an elevated temperature, preferably about 60° C., and also utilizing high shear forces or ultrasonic equipment. The solution must then be cooled, preferably below about 30° C.

If this process is not followed the PVP will form aggregates. In that case, during the membrane-forming process these PVP aggregates will precipitate and be washed out, leaving microholes in the membrane.

Before extrusion, any possible additives are then mixed into the mixture of these two solutions (of the hydrophilic and hydrophobic polymers). These additives are used in order to form proper pore structures and to optimize therewith the membrane permeability, the hydraulic and diffusive permeability and the sieving properties. These additives may be said to operate as pore controllers. Substances which may be used for this purpose are non-solvents or relatively weak solvents for the hydrophobic polymer, preferably alcohols, glycerols and water.

In order to provide a hollow fiber membrane according to the present invention, the above mixture is extruded through a nozzle having two concentric openings. The polymer solution is extruded through the outer ring slit, and the center fluid is extruded through the inner core opening, preferably comprising the non-solvent for the hydrophobic polymer. The fiber is then immersed in baths of non-solvents or fluids which can replace and wash out the solvent. Polar solvents like DMF, DMSO or DMAc are preferably used as the solvents.

In order to achieve an optimal structure in the membranes according to this invention (the three integral layers hereof) the center fluid (for a hollow fiber), or the first precipitation fluid bath (for a flat film) should preferably be a mixture of the hydrophilic polymer, an additive and a solvent, i.e., mixed with the non-solvent. It has been found that with this preferred composition (for the center fluid and the above-described polymer solution) the typical integral three-layer structure hereof is formed. Depending on the ratio of the components the three layers have different thicknesses. The present invention may be more fully appreciated with reference to the following examples thereof.

EXAMPLE 1

In accordance with the above-described manufacturing technique, 13 wt. % polyamide was dissolved in a solution containing three wt. %. PVP ($\overline{M}_w$ 100,000), 3 wt. % water, and 81 wt. % DMSO. This polymer solution was degassed and filtered, and then pumped through a concentric hollow fiber spinning jet. The polymer was extruded through an outer ring slit with an outer diameter of about 0.35 mm, and an inner diameter of about 0.25 mm. From the inner orifice of the jet a solution of 30% DMSO, 3% PVP, and 67% water was extruded.

A hollow fiber was thus formed with a 215$\mu$ inner diameter and 50$\mu$ wall thickness. This fiber was then washed thoroughly with non-pyrogenic water, and then treated with a mixture of 40% glycerol and 60% water, and finally dried with air.

The membrane thus formed had the three-layer structure hereof, with the inner dense skin layer having a thickness of about 1$\mu$, the sponge-like substructure having a thickness of about 5$\mu$ and the outer open finger-like structure having a thickness of about 45$\mu$.

EXAMPLE 2

Twelve wt. % polyamide was dissolved in 85 wt. % DMSO together with 1% PVP and 2% $H_2O$, in the manner described in Example 1. The polymer solution was then cast with a slit jet on a belt, and transported through a precipitation bath containing 68% water, 2% PVP and 30% DMSO. The flat membrane had a thickness of 60$\mu$. After washing, glycerolization and drying the membrane could be wound without support.

EXAMPLE 3

Figure 7:
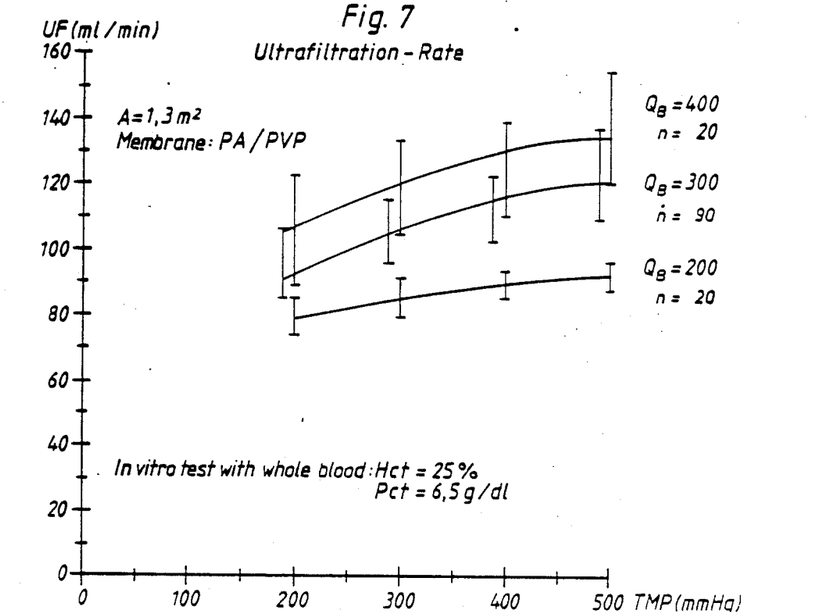
FIG. 7 is a graph of the ultrafiltration rate of the membrane in accordance with the present invention at various transmembrane pressures and blood flows.

Hollow fiber membranes produced in the manner described in Example 1 were assembled in a dialyzer with a 1.3 $m^2$ surface area. Ultrafiltration with water was measured therewith to be 250 ml/mm Hg.$m^2$.h. With whole blood, the ultrafiltration was dependent on flow parameters and blood composition (hematocrite Hct, protein concentration Pct, blood flow and transmembrane pressure), and was influenced by protein concentration polarization. At a blood flow of 300 ml/min a maximum ultrafiltration of 120 ml/min was achieved, with blood of 25% Hct and 65 g/l total protein (see FIG. 7).

Figure 8:
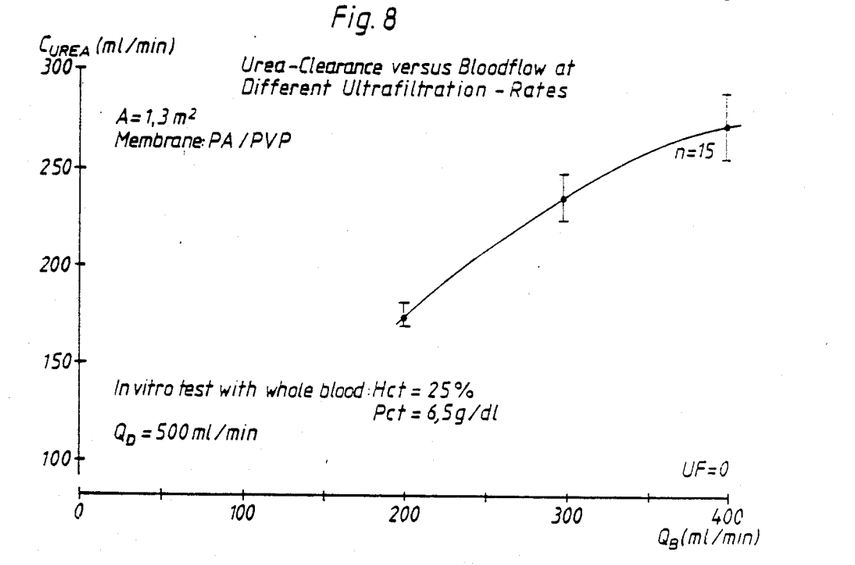
FIG. 8 is a graph of the urea clearance for membranes according to the present invention at various blood flows.

The diffusive permeability was estimated by the clearance. Clearances for urea, measured in blood for a dialyzer prepared according to Example 3, with blood flows of 200, 300, and 400 ml/min, are shown in FIG. 8. The ultrafiltration therewith was prohibited to 0. The total protein in the filtrate was less than about 0.05 g/l filtrate.

The $\beta_2$-M permeability was measured in clinical use for the same dialyzer by measuring the concentration of $\beta_2$-M in the venous ($C_v$) and arterial ($C_a$) blood stream, and in the filtrate ($C_f$).

The calculated sieving coefficient $$S = \frac{2c_F}{C_v + C_a}$$

was 0.65.

Refection of endotoxins released (from E-coli) was measured with suspensions loaded (challenge) with 1.25 ng/ml E-coli endotoxins The LRV (as defined above) was 4.0.

EXAMPLE 4

A solution of 13% pA, 3% pVP, 3% H$_2$O, and 81% DMSO was spun with a center fluid of 90% H$_2$O, 1% PVP and 9% DMSO to form a hollow fiber having the dimensions set forth in Example 1. The hollow fiber had the three-layer integral structure typical for the membranes of the present invention. The sieving coefficient (measured with plasma containing 65 g/l total protein concentration) for $\beta_2$-M was measured to be 0.8. In spite of this high sieving coefficient for $\beta_2$-M, the sieving coefficient for the total protein was below 0.001.

EXAMPLE 5

A solution of 11% PA, 1% PVP, 3% H$_2$O, and 85% DMSO was spun with a center fluid of 98% H$_2$O and 2% PVP to form a hollow fiber having the dimensions set forth in Example The sieving coefficient for $\beta_2$-M was measured in plasma to be 0.62, and for total protein was again below 0.001.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

We claim:

1. A selectively permeable asymmetric membrane suitable for use in hemodialysis comprising a hydrophobic polymer and a hydrophilic polymer, said membrane including a first layer comprising a dense thin skin layer including substantially uniform pore openings defining the selective permeability of said membrane, an intermediate second layer in contact with said first layer in the form of a sponge and having a diffusive permeability higher than that of said first layer, said second intermediate layer supporting said first layer, and a third layer in contact with said second intermediate layer and including a finger-like structure providing mechanical stability for said membrane, said substantially uniform pore openings in said first layer having a size whereby proteins having a molecular weight of at least that of albumin are substantially completely rejected from said membrane.

2. The membrane of claim 1 wherein said substantially uniform pore openings in said first layer have a pore size of not greater than about 80 Angstroms.

3. The membrane of claim 1 wherein said first layer has a thickness of less than about 1$\mu$.

4. The membrane of claim 1 in the form of a substantially flat sheet.

5. The membrane of claim 1 in the form of a hollow fiber, wherein said first layer comprises the inner layer of said hollow fiber and said third layer comprises the outer layer of said hollow fiber membrane.

6. The membrane of claim prepared from a polymer mixture including said hydrophobic polymer and said hydrophilic polymer wherein the fraction of said hydrophobic polymer in said mixture is between about 85 and 95% and the fraction of said hydrophilic polymer in said mixture is between about 5 and 15%.

7. The membrane of claim 1 wherein said hydrophobic polymer is selected from the group consisting of polyarylsulfone, polycarbonate, polyamide, polyvinylchloride, modified acrylic acid, polyether, polyurethane, polyetherketone, polyacrylonitrile, polypropylene, polyetherimide and copolymers of said polymers.

8. The membrane of claim 7 wherein said hydrophobic polymer comprises a polyamide.

9. The membrane of claim 1 wherein said hydrophilic polymer is selected from the group consisting of polyvinylpyrrolidone, polyethyleneglycol, polyglycolmonoester, copolymers of polyethyleneglycol with polypropyleneglycol, water soluble cellulosic derivatives, polysorbate, and polyethylene-polypropylene oxide copolymers and mixtures thereof.

10. The membrane of claim 9 wherein said hydrophilic polymer comprises polyvinylpyrrolidone.

11. The membrane of claim 1 including an additive selected from the group consisting of non-solvents and relatively weak solvents for said hydrophobic polymer.

12. The membrane of claim 11 wherein said additive is selected from the group consisting of alcohols, glycerols, water, and mixtures thereof.

13. The membrane of claim wherein said substantially uniform pore openings in said first layer provide said membrane with a sieving coefficient for beta-2-microglobulin having a molecular weight of about 11,500 in blood which is at least about 0.6.

14. The membrane of claim 1 wherein said intermediate second layer has a thickness of between about 1 and 20$\mu$.

15. The membrane of claim 14 wherein said intermediate second layer has a thickness of between about 3 and 5$\mu$.

16. The membrane of claim 1 wherein said third layer has a thickness of between about 20 and 60$\mu$.

17. The membrane of claim 16 wherein said third layer preferably has a thickness of about 40$\mu$.

18. The membrane of claim 1 having a logarithmic reduction value of at least about 3 for the rejection of endotoxins.

19. A process for manufacturing selectively permeable asymmetric membranes suitable for use in hemodialysis comprising dissolving a hydrophobic polymer in a first solvent so as to prepare a first solution, dissolving a hydrophilic polymer in a second solvent so as to prepare a second solution, mixing said first and second solutions, and introducing said mixture of said first and second solutions into a precipitating liquid so as to form a coagulated membrane therefrom.

20. The process of claim 19 including washing said coagulated membrane.

21. The process of claim 20 including drying said washed coagulated membrane.

22. The process of claim 19 wherein said mixing of said first and second solutions is conducted at a first temperature, and wherein said introduction of said mixture into said precipitating liquid is conducted at a second temperature, said first temperature being higher than said second temperature.

23. The process of claim 22 wherein said first temperature is approximately 60° C., and said second temperature is preferably below about 30° C.

24. The process of claim 19 wherein said mixing of said first and second solutions is conducted under conditions of high shear mixing.

25. The process of claim 19 wherein said first and second solvents comprise the same solvent.

26. The process of claim 19 wherein said first and second solvents are selected from the group consisting of dimethylacetamide, dimethylformamide, dimethylsulfoxide, n-methyl-pyrrolidone, and mixtures thereof.

27. The process of claim 26 wherein said first and second solvents comprise dimethylsulfoxide.

28. The process of claim 19 wherein said precipitating liquid includes a solvent for said hydrophilic polymer.

29. The process of claim 28 wherein said solvent for said hydrophilic polymer comprises water.

30. The process of claim 28 wherein said precipitating liquid also includes a solvent for said hydrophobic polymer.

31. The process of claim 30 wherein said solvent for said hydrophobic polymer comprises dimethylsulfoxide.

32. The process of claim 28 wherein said precipitating liquid also includes said hydrophilic polymer.

33. The process of claim 32 wherein said hydrophilic polymer comprises polyvinylpyrrolidone.

34. The process of claim 28 wherein said hydrophobic polymer comprises polyamide, said hydrophilic polymer comprises polyvinylpyrrolidone, wherein said solvent for said hydrophilic polymer comprises water, and said solvent for said hydrophobic polymer comprises dimethylsulfoxide.

35. The process of claim 34 wherein said precipitating liquid includes about 70% of said water and about 30% of said dimethylsulfoxide.

36. The process of claim 19 wherein said introducing of said mixture into said precipitating liquid comprises extrusion in the form of a hollow fiber, and wherein said precipitating liquid is simultaneously extruded within the center of said hollow fiber within said mixture of said first and second solutions.

37. The process of claim 19 including rinsing said coagulated membrane with water, glycerolization of said rinsed membrane, and drying of said membrane.

38. The process of claim 19 wherein said mixture of said first and second solutions comprises between about 78 and 88% of said first and second solvents, between about 10 and 15% of said hydrophobic polymer, and between about 0.5 and 5% of said hydrophilic polymer.

39. The process of claim 38 wherein said mixture of said first and second solutions further includes between about 0.5 and 5% of an additive selected from the group consisting of non-solvents and relatively weak solvents for said hydrophobic polymer.

40. The process of claim 39 wherein said additive is selected from the group consisting of alcohol, glycerols, water, and mixtures thereof.

41. The membrane of claim 1 wherein said substantially uniform pore openings in said first layer have a pore size of between 20 and 200 Angstroms.

42. The membrane of claim 1 wherein said substantially uniform pore openings in said first layer have a pore size of between 20 and 80 Angstroms.

* * * * *

UNITED STATES PATENT AND TRADEMARK OFFICE
CERTIFICATE OF CORRECTION

PATENT NO. : 4,935,141
DATED : June 19, 1990
INVENTOR(S) : Reinhold J. Buck and Hermann J. Goehl It is certified that error appears in the above-identified patent and that said Letters Patent is hereby corrected as shown below:

Column 9, line 45, following "Example" insert --1.--.

Column 10, line 18, following "claim" insert --1--.

Column 10, line 48, following "claim" insert --1--.

Signed and Sealed this

Seventeenth Day of September, 1991

Attest:

HARRY F. MANBECK, JR.

*Attesting Officer*  *Commissioner of Patents and Trademarks*